United States Patent
Nishi

(10) Patent No.: US 11,682,500 B2
(45) Date of Patent: Jun. 20, 2023

(54) ULTRATHIN LOW-VOLTAGE ELECTRIC WIRE FOR AN AUTOMOBILE, AND WIRE HARNESS INCLUDING SAME

(71) Applicant: Yazaki Corporation, Tokyo (JP)

(72) Inventor: Yuki Nishi, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 17/854,557

(22) Filed: Jun. 30, 2022

(65) Prior Publication Data

US 2023/0038416 A1 Feb. 9, 2023

(30) Foreign Application Priority Data

Jul. 7, 2021 (JP) .............................. JP2021-112945

(51) Int. Cl.
  *H01B 3/44* (2006.01)
  *B60R 16/02* (2006.01)
  *H01B 7/00* (2006.01)

(52) U.S. Cl.
  CPC ......... *H01B 3/448* (2013.01); *B60R 16/0207* (2013.01); *H01B 7/0045* (2013.01)

(58) Field of Classification Search
  CPC .... H01B 3/448; H01B 7/0045; B60R 16/0207
  See application file for complete search history.

(56) References Cited

U.S. PATENT DOCUMENTS

2014/0079951 A1  3/2014  Yamauchi
2018/0102199 A1*  4/2018  Uegaki ................... H01B 5/08

FOREIGN PATENT DOCUMENTS

| CN | 1754909 A | * | 4/2006 | ............... C08K 5/12 |
| CN | 111040333 A | * | 4/2020 | ............... C08L 27/06 |
| JP | 2012-246341 A | | 12/2012 | |
| JP | 2019070066 A | * | 5/2019 | ............... C08K 3/22 |
| JP | 2021024957 A | * | 2/2021 | ............... C08K 3/22 |

* cited by examiner

*Primary Examiner* — Paresh Paghadal
(74) *Attorney, Agent, or Firm* — Sughrue Mion, PLLC

(57) ABSTRACT

Provided is an ultrathin low-voltage electric wire for an automobile that includes a conductor part and an insulating layer covering the outer periphery of the conductor part, wherein the insulating layer includes a resin composition containing 100 parts by mass of a vinyl chloride resin, 29 to 31 parts by mass of a trimellitic acid-based ester plasticizer, 0.3 to 1.0 parts by mass of a processing aid, and 7 to 11 parts by mass of a thermal stabilizer, the conductor part has a cross-sectional area of $0.13\pm0.02$ mm$^2$, and the insulating layer has a thickness of 0.16 to 0.25 mm.

2 Claims, 1 Drawing Sheet

ULTRATHIN LOW-VOLTAGE ELECTRIC WIRE FOR AN AUTOMOBILE, AND WIRE HARNESS INCLUDING SAME

CROSS REFERENCE TO RELATED APPLICATION

The present application is based on, and claims priority from the prior Japanese Patent Application No. 2021-112945, filed on Jul. 7, 2021, the entire contents of which are incorporated herein by reference.

TECHNICAL FIELD

The present disclosure relates to an ultrathin low-voltage electric wire for an automobile, and a wire harness including the same.

BACKGROUND

An electric wire used for a wire harness, an electronic apparatus, and the like for an automobile includes a conductor and an insulating layer, which covers the outer periphery of the conductor. The insulating layer is typically made of a resin composition containing a vinyl chloride resin and an additive such as a plasticizer and a thermal stabilizer. The insulating layer of the electric wire should typically have characteristics defined in ISO19642, such as abrasion resistance, thermal stability, heat resistance, and cold resistance.

In an electric wire for an automobile, the diameter of the conductor should be made small, and the thickness of the insulating layer should be reduced. For example, it is desired that the conductor have a diameter as small as about 0.13 $mm^2$ in the cross sectional area in a stranded wire or a single wire. Moreover, it is desired that the insulating layer covering the small-diameter conductor be thinned to a thickness of about 0.2 mm, for example.

A thin insulating layer tends to have abrasion resistance issues. Thus, as a method for preventing the decrease in the abrasion resistance of the insulating layer, increasing the hardness of the resin composition by reducing the amount of a plasticizer in the resin composition has been considered. However, the insulating layer obtained by means of this method is likely to have low cold resistance and low heat resistance due to a decrease in flexibility, and in addition, the appearance of the electric wire easily deteriorates. The appearance of the electric wire can be evaluated as "good" when the average value of the surface roughness Ra (µm) of the insulating layer of the electric wire is small and as "bad" when large.

Japanese Patent Application Publication No. 2012-246341 A discloses adjustment of the amount of a plasticizer in a resin composition and addition of a modifier and ultrafine particle silica, performed for a thin electric wire. The thin electric wire is considered to satisfy the abrasion resistance and cold resistance according to ISO6722.

SUMMARY

However, it has been desired that ultrathin low-voltage electric wires constituting a wire harness for an automobile comply with LV112, which is a European standard having stricter standards than ISO19642.

The thin electric wire disclosed in JP 2012-246341 A may not have sufficient thermal stability satisfying the requirements of LV112. Note that increasing the amount of the thermal stabilizer can be considered as a method of preventing the decrease in the thermal stability of the insulating layer, but this method easily deteriorates the appearance due to the occurrence of roughness and irregularities on the surface of the electric wire.

In the thin electric wire disclosed in JP 2012-246341 A, when the amount of the plasticizer is less than 32 parts by mass per 100 parts by mass of the vinyl chloride resin, the appearance easily deteriorates and the heat resistance easily decreases. Moreover, in the thin electric wire disclosed in JP 2012-246341 A, when the amount of the plasticizer is 32 parts by mass or more per 100 parts by mass of the vinyl chloride resin, the abrasion resistance easily decreases. As described above, it tends to be difficult for the thin electric wire disclosed in JP 2012-246341 A to achieve both the abrasion resistance and the appearance.

Note that "low-temperature resistance" defined in LV112 is equivalent to the "cold resistance" defined in ISO6722. It is thus considered that the thin electric wire disclosed in JP 2012-246341 A satisfies the "low-temperature resistance" defined by LV112. It is typically preferable that the ultrathin low-voltage electric wire have excellent processability. However, the thin electric wire disclosed in JP 2012-246341 A does not satisfy all of abrasion resistance, thermal stability, low-temperature resistance, heat resistance, and processability at a high level.

As described above, there has been no known ultrathin low-voltage electric wire that satisfies abrasion resistance, thermal stability, low-temperature resistance, heat resistance, and processability at a high level.

In response to the above issue, it is an object of the present disclosure to provide an ultrathin low-voltage electric wire that satisfies abrasion resistance, thermal stability, low-temperature resistance, heat resistance, and processability at a high level, and a wire harness including the ultrathin low-voltage electric wire.

It is an object of the present disclosure to provide an ultrathin low-voltage electric wire for an automobile, the wire including a conductor part and an insulating layer covering the outer periphery of the conductor part, wherein the insulating layer includes a resin composition containing 100 parts by mass of a vinyl chloride resin, 29 to 31 parts by mass of a trimellitic acid-based ester plasticizer, 0.3 to 1.0 parts by mass of a processing aid, and 7 to 11 parts by mass of a thermal stabilizer, the conductor part has a cross-sectional area of 0.13±0.02 $mm^2$, and the insulating layer has a thickness of 0.16 to 0.25 mm.

It is an object of the present disclosure to provide a wire harness including the ultrathin low-voltage electric wire for an automobile.

According to the above-described configuration, it is possible to provide an ultrathin low-voltage electric wire that satisfies abrasion resistance, thermal stability, low-temperature resistance, heat resistance, and processability at a high level, and a wire harness including the ultrathin low-voltage electric wire.

DETAILED DESCRIPTION

Various embodiments will be described hereinafter with reference to the accompanying drawings.

A detailed description is given below of an electric wire (ultrathin low-voltage electric wire for an automobile) and a wire harness including the same according to embodiments with reference to the drawings.

[Electric Wire]

Figure 1:
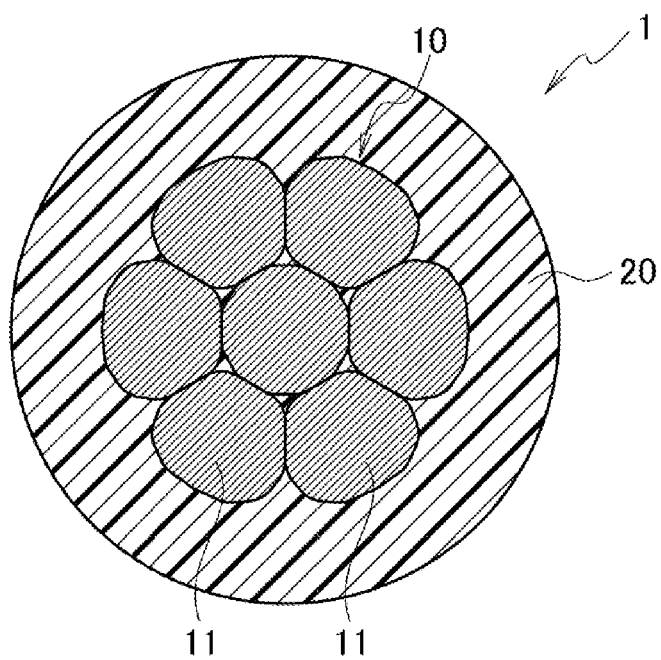
FIG. 1 is a cross-sectional view of an example of an electric wire (ultrathin low-voltage electric wire for an automobile) according to an embodiment.

FIG. 1 is a cross-sectional view of an example of an electric wire (ultrathin low-voltage electric wire for an automobile) according to an embodiment. As illustrated in FIG. 1, an electric wire (ultrathin low-voltage electric wire for an automobile) 1 includes a conductor part 10 and an insulating layer 20 covering the outer periphery of the conductor part 10. Note that an ultrathin low-voltage electric wire for an automobile means the electric wire 1 for an automobile having a cross-sectional area for the conductor part 10 of about 0.13 mm$^2$ and a thickness for the insulating layer 20 of 0.16 to 0.25 mm.

(Conductor Part)

The conductor part 10 is made of a conductor. The conductor part 10 in FIG. 1 is a stranded wire formed by compressing seven single-wire conductors 11 from the periphery. Note that as a modification of the conductor part 10, a stranded wire having a number of single-wire conductors 11 other than seven or a stranded wire that has not been compressed from the periphery may be used. As another modification of the conductor part 10, the conductor part may be formed of only one single-wire conductor 11.

The cross-sectional area of the conductor part 10 is 0.13±0.02 mm$^2$. Note that when the conductor part 10 is a stranded wire as illustrated in FIG. 1, the cross-sectional area of the conductor part 10 is the total cross-sectional areas of all of the single-wire conductors 11 in the electric wire 1. When the conductor part 10 is made of only one single-wire conductor 11, the cross-sectional area of the conductor part 10 is the cross-sectional area of the single-wire conductor 11.

As the material of the conductor part 10, copper, a copper alloy, or the like is used, for example.

(Insulating Layer)

The insulating layer 20 covers the outer periphery of the conductor part 10 and is made of a resin composition. The resin composition used in the embodiment contains a vinyl chloride resin, a trimellitic acid-based ester plasticizer, a processing aid, and a thermal stabilizer.

<Vinyl Chloride Resin>

As the vinyl chloride resin, a conventional vinyl chloride resin used for insulation of electric wires can be used, for example. The average degree of polymerization (weight-average degree of polymerization) of the vinyl chloride resin used is not limited and is preferably 1300 to 2000. When the average degree of polymerization is within the above-described range, cold resistance and abrasion resistance of the resin composition are easily improved. Note that in the insulating layer 20, one or a combination of two or more kinds of vinyl chloride resins in the above-described range of the degree of polymerization may be used.

<Trimellitic Acid-Based Ester Plasticizer>

The trimellitic acid-based ester plasticizer has a function of imparting flexibility to the resin composition by permeating among molecules of the vinyl chloride resin and weakening the intermolecular force. The trimellitic acid-based ester plasticizer has high cold resistance, high weather resistance, and low volatility and is used for heat-resistant electric wires and the like.

Examples of the trimellitic acid-based ester plasticizer include the following.

Tris(2-ethylhexyl) trimellitate (hereinafter also referred to as "TOTM")

[Chem. 1]

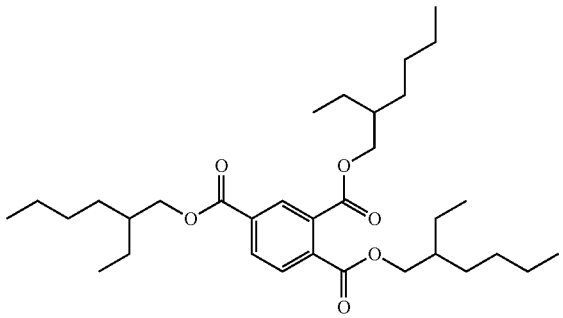

(P1)

Tri(n-octyl) trimellitate (hereinafter also referred to as "n-TOTM")

[Chem. 2]

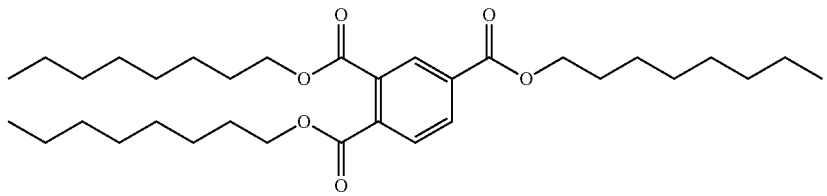

(P2)

Trinonyl trimellitate (hereinafter also referred to as "TNTM")

[Chem. 3]

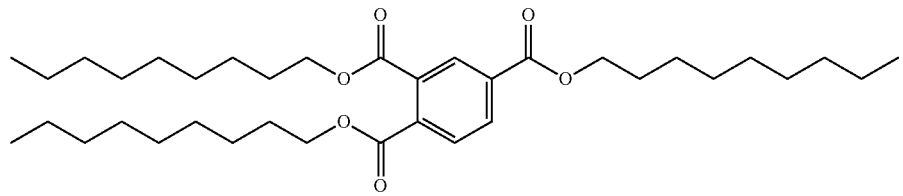

(P3)

<Content of Trimellitic Acid-Based Ester Plasticizer>

The resin composition contains 29 to 31 parts by mass, preferably 29.5 to 30.5 parts by mass, of a trimellitic acid-based ester plasticizer per 100 parts by mass of a vinyl chloride resin. Note that when multiple kinds of trimellitic acid-based ester plasticizers are mixed, the content of a trimellitic acid-based ester plasticizer is the total content of the multiple kinds of trimellitic acid-based ester plasticizers.

Note that when the content of the trimellitic acid-based ester plasticizer is less than 29 parts by mass per 100 parts by mass of the vinyl chloride resin, the heat resistance of the insulating layer 20 easily decreases. In contrast, when the content of the trimellitic acid-based ester plasticizer exceeds 31 parts by mass per 100 parts by mass of the vinyl chloride resin, the abrasion resistance of the insulating layer 20 easily decreases.

<Processing Aid>

The processing aid has a function of improving the processability of the resin composition. Examples of the processing aid used include an acrylic polymer, a silicone-based polymer, polyethylene wax, and metal stearate. Examples of the acrylic polymer used include an acrylic processing aid made of a homopolymer of (meth)acrylic acid or (meth)acrylic acid ester, or a copolymer of (meth)acrylic acid and (meth)acrylic acid ester. Preferably, the processing aid is an acrylic polymer, such as PMMA, because it is possible to have a melt viscosity (extrusion property) suitable for the extrusion coating process in manufacturing insulated wires and the appearance of the electric wire 1 is easily improved.

<Content of Processing Aid>

The resin composition contains 0.3 to 1.0 parts by mass, preferably 0.3 to 0.55 parts by mass, of the processing aid per 100 parts by mass of the vinyl chloride resin. Note that when multiple kinds of processing aids are mixed, the content of the processing aid is the total content of the multiple kinds of processing aids. When the content of the processing aid is within the above-described ranges, it is easy to obtain the ultrathin low-voltage electric wire 1 satisfying abrasion resistance, thermal stability, low-temperature resistance, heat resistance, and processability at a high level.

Note that when the content of the processing aid is less than 0.3 parts by mass per 100 parts by mass of the vinyl chloride resin, the smoothness of the surface of the insulating layer 20 is lost, and the appearance of the electric wire 1 easily deteriorates. The appearance of the electric wire 1 is evaluated using electric wire surface roughness, for example. Here, the electric wire surface roughness is an index for evaluating the appearance of the electric wire 1; the greater the surface roughness, the more inferior the appearance. When the content of the processing aid is less than 0.3 parts by mass per 100 parts by mass of the vinyl chloride resin, the electric wire surface roughness increases and the appearance easily deteriorates. The electric wire surface roughness is described later. In contrast, when the content of the processing aid exceeds 1.0 parts by mass per 100 parts by mass of the vinyl chloride resin, eccentricity of the conductor part 10 in the electric wire 1 occurs and the eccentricity amount is likely to increase. Here, the eccentricity amount is an index for indicating a deviation between the center of the electric wire 1 and the center of the conductor part 10 in the cross section of the electric wire 1. The eccentricity amount is described later.

<Thermal Stabilizer>

The thermal stabilizer suppresses generation of hydrogen chloride during heating of the resin composition and has a function of stabilizing characteristics of the vinyl chloride resin. As the thermal stabilizer, a lead-free thermal stabilizer is used. Examples of the lead-free thermal stabilizer used include at least one kind of stabilizer selected from the group consisting of a Ca—Mg—Zn-based thermal stabilizer, a Ca—Zn-based thermal stabilizer, a Zn—Mg-based stabilizer, an Sn-based stabilizer, a Ba-based stabilizer, a Zn-based stabilizer, and a Ca-based stabilizer. Of these, the Ca—Mg—Zn-based thermal stabilizer, the Ca—Zn-based thermal stabilizer, and the Zn—Mg-based stabilizer are excellent in terms of heat resistance and thermal stability. Thus, the use of these Ca—Mg—Zn-based thermal stabilizers is preferable because it is possible to maintain the heat resistance of the insulating layer 20 for a long period of time even when the electric wire 1 is used in high-temperature parts of automobiles.

<Content of Thermal Stabilizer>

The resin composition contains 7 to 11 parts by mass, preferably 7.5 to 9.5 parts by mass, of the thermal stabilizer per 100 parts by mass of the vinyl chloride resin. Note that when multiple kinds of thermal stabilizers are mixed, the content of the thermal stabilizer is the total content of the multiple kinds of thermal stabilizers. Preferably, the content of the thermal stabilizer is within the above-described ranges because it is easy to obtain the ultrathin low-voltage electric wire 1 satisfying abrasion resistance, thermal stability, low-temperature resistance, heat resistance, and processability at a high level.

Note that when the content of the thermal stabilizer is less than 7 parts by mass per 100 parts by mass of the vinyl chloride resin, the thermal stability of the insulating layer 20 easily decreases. In contrast, when the content of the thermal stabilizer exceeds 11 parts by mass per 100 parts by mass of the vinyl chloride resin, the smoothness of the surface of the insulating layer 20 is lost, and the appearance of the electric wire 1 easily deteriorates. The appearance of the electric wire 1 is evaluated using the electric wire surface roughness, for example.

<Reinforcing Agent>

The resin composition may further contain a reinforcing agent. The reinforcing agent is an additive for reinforcing the resin composition. Examples of the reinforcing agent used include calcium carbonate and silica ($SiO_2$). Of these, calcium carbonate is preferable for improving the abrasion resistance and low temperature impact resistance of the resin composition.

<Content of Reinforcing Agent>

The resin composition contains, for example, 3 to 7 parts by mass, preferably 4 to 6 parts by mass, of the reinforcing agent per 100 parts by mass of the vinyl chloride resin. Note that when multiple kinds of reinforcing agents are mixed, the content of the reinforcing agent is the total content of the multiple kinds of reinforcing agents. Preferably, the content of the reinforcing agent is within the above-described ranges because it is easy to obtain the ultrathin low-voltage electric wire 1 satisfying abrasion resistance, thermal stability, low-temperature resistance, heat resistance, and processability at a high level.

<Modifier>

The resin composition may further include a modifier. Examples of the modifier used include a shock resistant modifier for improving the impact resistance of the resin composition. Examples of the impact modifier used include a methyl methacrylate-butadiene-styrene copolymer (MBS), an acrylonitrile-butadiene-styrene copolymer (ABS), chlorinated polyethylene, and an ethylene-vinyl acetate copolymer (EVA).

<Content of Modifier>

The resin composition contains, for example, 1 to 5 parts by mass, preferably 2 to 4 parts by mass, of the modifier per 100 parts by mass of the vinyl chloride resin. Note that when multiple kinds of modifiers are mixed, the content of the modifiers is the content of the total content of the multiple kinds of modifiers. Preferably, the content of the modifier is within the above-described ranges because it is easy to obtain the ultrathin low-voltage electric wire 1 satisfying abrasion resistance, thermal stability, low-temperature resistance, heat resistance, and processability at a high level.

<Thickness of Insulating Layer>

The thickness of the insulating layer 20 is 0.16 to 0.25 mm, preferably 0.18 to 0.22 mm. When the thickness of the insulating layer 20 is within the above-described ranges, it is easy to obtain the ultrathin low-voltage electric wire 1 satisfying abrasion resistance, thermal stability, low-temperature resistance, heat resistance, and processability at a high level. Note that when the thickness of the insulating layer 20 is less than 0.16 mm, the abrasion resistance of the insulating layer 20 easily decreases.

The resin composition can be manufactured by a known method. The insulating layer 20 can be formed on the outer periphery of the conductor part 10 using the resin composition by a known method. By forming the insulating layer 20 on the outer periphery of the conductor part 10, the electric wire 1 is obtained.

(Evaluation of Electric Wire)

The electric wire 1 is evaluated as follows.

<Evaluation of Appearance: Evaluation of Electric Wire Surface Roughness>

The appearance of the electric wire 1 is evaluated by measuring the electric wire surface roughness. Here, the electric wire surface roughness is the average value (μm) of five values of surface roughness Ra (μm) measured at five different locations on the surface of the insulating layer 20 of the electric wire 1 with a measurement length of 30 mm along the longitudinal direction of the electric wire 1 using a digital microscope.

For the electric wire 1 having the cross-sectional area of the conductor part 10 of 0.13 mm$^2$ and the thickness of the insulating layer 20 of 0.2 mm, the appearance is evaluated as "good" when the electric wire surface roughness is less than 3.5 μm and as "bad" when the electric wire surface roughness is 3.5 μm or more.

<Evaluation of Appearance: Evaluation of Eccentricity Amount>

The appearance of the electric wire 1 is evaluated by measuring the eccentricity amount. Here, the eccentricity amount is an index for indicating a deviation between the center of the electric wire 1 and the center of the conductor part 10 in the cross section of the electric wire 1. The eccentricity amount is a value calculated by the following calculation formula (1).

[Math 1]

$$\text{Eccentricity amount} = (\text{thickness } b - \text{thickness } a)/2 \quad (1)$$

(where thickness a is the minimum value (mm) of the thickness of the insulating layer 20 in a section X having the electric wire 1, and thickness b is the maximum value (mm) of the thickness of the insulating layer 20 in the section X)

For the electric wire 1 having the cross-sectional area of the conductor part 10 of 0.13 mm$^2$ and the thickness of the insulating layer 20 of 0.2 mm, the eccentricity amount is evaluated as "good" when the eccentricity amount is less than 0.04 mm and as "bad" when the eccentricity amount is 0.04 mm or more.

<Evaluation of Abrasion Resistance>

The abrasion resistance is evaluated by performing an abrasion resistance test (scrape test) on each electric wire of the examples and comparative examples in accordance with ISO19642 5.3.2. Specifically, at a temperature of 23° C., a load of 7 N is applied to a blade, the blade is reciprocated along the electric wire, and the number of reciprocations until the blade is electrically connected to an inner copper wire is measured. The same measurement is repeated four times for one electric wire by rotating the one electric wire by 90 degrees about its axis. The abrasion resistance of the electric wire 1 can be evaluated by means of the minimum value in the four measurements.

For the electric wire 1 having the cross-sectional area of the conductor part 10 of 0.13 mm$^2$ and the thickness of the insulating layer 20 of 0.2 mm, the abrasion resistance is evaluated as "good" when the minimum number of reciprocations is 200 or more and as "bad" when the minimum number of reciprocations is less than 200.

<Evaluation of Thermal Stability>

The thermal stability is evaluated by performing a thermal stability test on each electric wire of the examples and comparative examples in accordance with International Standard DIN EN 60811-3-2 Part. 9. Specifically, an insulator sample is prepared by cutting an insulating layer of an electric wire so that each side thereof is approximately 1±0.5 mm. Next, 50 mg of the insulator sample is put in a glass test tube, heated in an oil bath at 200±3° C., and the time taken for the tip of a Congo red test paper to become clear blue is measured. The thermal stability of the electric wire 1 can be evaluated based on the minimum value of the time until discoloration.

For the electric wire 1 having the cross-sectional area of the conductor part 10 of 0.13 mm$^2$ and the thickness of the insulating layer 20 of 0.2 mm, the thermal stability is evaluated as "good" when the minimum value of the discoloration time is 140 minutes or more and as "bad" when the minimum value of the discoloration time is less than 140 minutes.

<Evaluation of Low-Temperature Resistance>

The low-temperature resistance is evaluated by performing a low temperature winding test on each electric wire of the examples and comparative examples in accordance with ISO19642 5.4.7. Specifically, a mandrel and the electric wire 1 are cooled to −40° C. for 4 hours or more. Then, the electric wire is wound on the mandrel having an outer diameter five times the outer diameter of the electric wire 1, and it is confirmed that the conductor part of the wire wound is not exposed. If the conductor part is not exposed at this time, a voltage of 1000 V is applied between the conductor of the electric wire and the outer peripheral surface of the coating layer for 1 minute, and the presence or absence of dielectric breakdown in the coating layer is examined.

For the electric wire 1 having the cross-sectional area of the conductor part 10 of 0.13 mm$^2$ and the thickness of the insulating layer 20 of 0.2 mm, having no dielectric breakdown is evaluated as "good" and having dielectric breakdown is evaluated as "bad".

<Evaluation of Heat Resistance>

The heat resistance is evaluated by performing a short-term heating test on each electric wire of the examples and comparative examples in accordance with ISO19642 5.4.3. Specifically, the electric wire is heated at a temperature of 130° C. for 240 hours. After being heated, the electric wire is left at room temperature for 16 hours and then cooled at a temperature of −25° C. Then, the electric wire is wound on a mandrel having an outer diameter five times the outer diameter of the electric wire, and it is confirmed that the conductor part of the wire wound is not exposed. If the conductor part is not exposed at this time, a voltage of 1000 V is applied between the conductor of the electric wire and the outer peripheral surface of the coating layer for 1 minute, and the presence or absence of dielectric breakdown in the coating layer is examined.

For the electric wire 1 having the cross-sectional area of the conductor part 10 of 0.13 mm$^2$ and the thickness of the insulating layer 20 of 0.2 mm, having no dielectric breakdown is evaluated as "good" and having dielectric breakdown is evaluated as "bad".

(Effect)

According to the electric wire 1, it is possible to provide the ultrathin low-voltage electric wire satisfying abrasion resistance, thermal stability, low-temperature resistance, heat resistance, and processability at a high level.

[Wire Harness]

Figure 2:
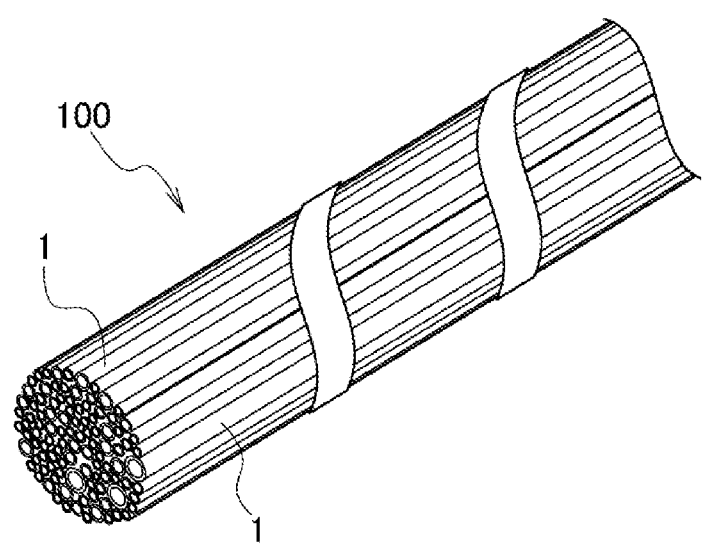
FIG. 2 is a perspective view of an example of a wire harness according to an embodiment.

FIG. 2 is a perspective view of an example of a wire harness according to an embodiment.

As illustrated in FIG. 2, an electric wire harness 100 includes the electric wire (ultrathin low-voltage electric wire for an automobile) 1. The wire harness 100 in FIG. 2 is an example of many electric wires 1 being combined into one. In the electric wire harness 100, an end portion (not shown) of the many electric wires 1 combined into one is usually connected to a multi-core type connector. The electric wire 1 here is the same as the one in FIG. 1. Thus, the description of the electric wire 1 is omitted.

(Effect)

According to the electric wire harness 100, it is possible to provide an electric wire harness satisfying abrasion resistance, thermal stability, low-temperature resistance, heat resistance, and processability at a high level.

EXAMPLES

The aforementioned embodiments are described in more detail with reference to the examples and comparative examples below, but the present embodiment is not limited to these examples.

Materials used in the examples and comparative examples are as follows.

Vinyl chloride resin: Straight Polymer TK-1300 (average degree of polymerization 1300) manufactured by Shin-Etsu Chemical Co., Ltd.

Plasticizer: TOTM (tris(2-ethylhexyl) trimellitate) manufactured by J-PLUS Co., Ltd.

Thermal stabilizer: lead-free (Ca—Mg—Zn-based) thermal stabilizer RUP-110 manufactured by ADEKA Corporation Reinforcing agent: calcium carbonate, product name: NEOLIGHT SP manufactured by Takehara Chemical Industrial Co., Ltd.

Modifier: Kane Ace B-564 manufactured by KANEKA CORPORATION Processing aid: Kane Ace PA-40 manufactured by KANEKA CORPORATION Example 1

(Manufacture of Electric Wire)

The electric wire 1 constituting the electric wire 1 in FIG. 1 was manufactured.

<Conductor Part>

As the conductor part 10, single-wire conductors 11 having the cross-sectional area of 0.13 mm$^2$ were prepared.

<Preparation of Resin Composition>

The resin composition as a raw material of the insulating layer 20 was prepared. Specifically, the resin composition was prepared by uniformly melt-kneading the vinyl chloride resin, the plasticizer, the thermal stabilizer, the reinforcing agent, the modifier, and the processing aid in the amounts shown in Table 1 at a temperature of 180° C. using an open roll.

TABLE 1

| | Experimental example No. | Example1 | Example2 | Example3 | Example4 | Example5 | Example6 | Example7 |
|---|---|---|---|---|---|---|---|---|
| Amounts (parts by mass) | Vinyl chloride resin | 100 | 100 | 100 | 100 | 100 | 100 | 100 |
| | Plasticizer | 29 | 30 | 31 | 30 | 30 | 30 | 30 |
| | Thermal stabilizer | 8 | 8 | 8 | 7 | 11 | 8 | 8 |
| | Filler | 5 | 5 | 5 | 5 | 5 | 5 | 5 |
| | Modifier | 3 | 3 | 3 | 3 | 3 | 3 | 3 |
| | Processing aid | 0.5 | 0.5 | 0.5 | 0.5 | 0.3 | 0.5 | 0.5 |
| Electric wire status | Electric wire size (sq) | 0.13 | 0.13 | 0.13 | 0.13 | 0.13 | 0.13 | 0.13 |
| | Coating resin thickness (mm) | 0.20 | 0.20 | 0.20 | 0.20 | 0.20 | 0.16 | 0.25 |
| | Electric wire surface roughness | good | good | good | good | good | good | good |
| | Eccentricity amount | good | good | good | good | good | good | good |
| Electric wire properties | Abrasion resistance | good | good | good | good | good | good | good |
| | Thermal stability | good | good | good | good | good | good | good |
| | Low-temperature resistance (winding test) | good | good | good | good | good | good | good |
| | Heat resistance | good | good | good | good | good | good | good |

<Extrusion Molding of Resin Composition>

Using a single screw extruder, the conductor part 10 and the resin composition were simultaneously extruded so that the resin composition was positioned around the outer periphery of the conductor part 10 and were cooled, and the electric wire 1 having the thickness of the insulating layer 20 of 0.2 mm was obtained.

(Evaluation of Electric Wires)

<Evaluation of Appearance: Evaluation of Electric Wire Surface Roughness>

The appearance of the electric wire 1 was evaluated by measuring the electric wire surface roughness. Here, the electric wire surface roughness is the average value (μm) of five values of surface roughness Ra (μm) measured at five different locations on the surface of the insulating layer 20 of the electric wire 1 with a measurement length of 30 mm along the longitudinal direction of the electric wire 1 using a digital microscope.

The appearance of the electric wire 1 was evaluated as "good" when the electric wire surface roughness was less than 3.5 μm and as "bad" when the electric wire surface roughness was 3.5 μm or more. The results are shown in Table 1.

<Evaluation of Appearance: Evaluation of Eccentricity Amount>

The appearance of the electric wire 1 was evaluated by measuring the eccentricity amount. Here, the eccentricity amount is an index for indicating a deviation between the center of the electric wire 1 and the center of the conductor part 10 in the cross section of the electric wire 1. The eccentricity amount is a value calculated by the following calculation formula (1).

[Math 1]

$$\text{Eccentricity amount} = (\text{thickness}\,b - \text{thickness}\,a)/2 \quad (1)$$

(where thickness a is the minimum value (mm) of the thickness of the insulating layer 20 in a section X having the electric wire 1, and thickness b is the maximum value (mm) of the thickness of the insulating layer 20 in the section X)

For the electric wire 1, the eccentricity amount was evaluated as "good" when the eccentricity amount is less than 0.04 mm and as "bad" when the eccentricity amount is 0.04 mm or more. The results are shown in Table 1.

<Evaluation of Abrasion Resistance>

The abrasion resistance was evaluated by performing an abrasion resistance test (scrape test) on each electric wire of the examples and comparative examples in accordance with ISO19642 5.3.2. Specifically, at a temperature of 23° C., a load of 7 N was applied to a blade, the blade was reciprocated along the electric wire, and the number of reciprocations until the blade was electrically connected to an inner copper wire was measured. The same measurement was repeated by rotating one electric wire by 90 degrees about its axis, and a total of four measurements were made on the one electric wire. The abrasion resistance of the electric wire 1 was evaluated by means of the minimum value in four measurements.

For the electric wire 1, the abrasion resistance was evaluated as "good" when the minimum number of reciprocations was 200 or more and as "bad" when the minimum number of reciprocations was less than 200. The results are shown in Table 1.

<Evaluation of Thermal Stability>

The thermal stability was evaluated by performing a thermal stability test on each electric wire of the examples and comparative examples in accordance with International Standard DIN EN 60811-3-2 Part. 9. Specifically, an insulator sample was prepared by cutting an insulating layer of an electric wire so that each side thereof is approximately 1±0.5 mm. Next, 50 mg of the insulator sample was put in a glass test tube, heated in an oil bath at 200±3° C., and the time taken for the tip of a Congo red test paper to become clear blue was measured. The thermal stability of the electric wire 1 was evaluated based on the minimum value of the time until discoloration.

For the electric wire 1, the thermal stability was evaluated as "good" when the minimum value of the discoloration time was 140 minutes or more and as "bad" when the minimum value of the discoloration time was less than 140 minutes. The results are shown in Table 1.

<Evaluation of Low-Temperature Resistance>

The low-temperature resistance was evaluated by performing a low temperature winding test on each electric wire of the examples and comparative examples in accordance with ISO19642 5.4.7. Specifically, a mandrel and the electric wire 1 were cooled to −40° C. for 4 hours or more. Then, the electric wire was wound on the mandrel having an outer diameter five times the outer diameter of the electric wire 1, and it was confirmed that the conductor part of the wire wound was not exposed. If the conductor part was not exposed at this time, a voltage of 1000 V was applied between the conductor of the electric wire and the outer peripheral surface of the coating layer for 1 minute, and the presence or absence of dielectric breakdown in the coating layer was examined.

For the electric wire 1, having no dielectric breakdown was evaluated as "good" and having dielectric breakdown was evaluated as "bad". The results are shown in Table 1.

<Evaluation of Heat Resistance>

The heat resistance was evaluated by performing a short-term heating test on each electric wire of the examples and comparative examples in accordance with ISO19642 5.4.3. Specifically, the electric wire was heated at a temperature of 130° C. for 240 hours. After having been heated, the electric wire was left at room temperature for 16 hours and then cooled at a temperature of −25° C. Then, the electric wire was wound on a mandrel having an outer diameter five times the outer diameter of the electric wire, and it was confirmed that the conductor part of the wire wound was not exposed. If the conductor part was not exposed at this time, a voltage of 1000 V was applied between the conductor of the electric wire and the outer peripheral surface of the coating layer for 1 minute, and the presence or absence of dielectric breakdown in the coating layer was examined.

For the electric wire 1, having no dielectric breakdown is evaluated as "good" and having dielectric breakdown is evaluated as "bad".

Examples 2 to 7, Comparative Examples 1 to 7

The electric wire 1 was manufactured and evaluated in the same manner as in Example 1 except that the resin composition constituting the insulating layer 20 was changed to have a composition in Tables 1 and 2. The results are shown in Tables 1 and 2.

TABLE 2

| Experimental example No. | | Comparative example1 | Comparative example2 | Comparative example3 | Comparative example4 | Comparative example5 | Comparative example6 | Comparative example7 |
|---|---|---|---|---|---|---|---|---|
| Amounts (parts by mass) | Vinyl chloride resin | 100 | 100 | 100 | 100 | 100 | 100 | 100 |
| | Plasticizer | 28 | 32 | 30 | 30 | 30 | 30 | 30 |
| | Thermal stabilizer | 8 | 8 | 6 | 12 | 8 | 8 | 8 |
| | Filler | 5 | 5 | 5 | 5 | 5 | 5 | 5 |
| | Modifier | 3 | 3 | 3 | 3 | 3 | 3 | 3 |
| | Processing aid | 0.5 | 0.5 | 0.5 | 0.5 | 0.0 | 1.3 | 0.5 |
| Electric wire status | Electric wire size (sq) | 0.13 | 0.13 | 0.13 | 0.13 | 0.13 | 0.13 | 0.13 |
| | Coating resin thickness (mm) | 0.20 | 0.20 | 0.20 | 0.20 | 0.20 | 0.20 | 0.15 |
| | Electric wire surface roughness | good | good | good | bad | bad | good | good |
| | Eccentricity amount | good | good | good | good | good | bad | good |
| Electric wire properties | Abrasion resistance | good | bad | good | good | good | good | bad |
| | Thermal stability | good | good | bad | good | good | good | good |
| | Low-temperature resistance (winding test) | good | good | good | good | good | good | good |
| | Heat resistance | bad | good | good | good | good | good | good |

From Tables 1 and 2, it has been found that the electric wires of Examples 1 to 7 are electric wires (ultrathin low-voltage electric wires) that satisfy abrasion resistance, thermal stability, low-temperature resistance, heat resistance, electric wire surface roughness, and eccentricity amount at a high level. Since the electric wire surface roughness and the eccentricity amount of the electric wire are evaluations related to processability, it has been found that the electric wires of Examples 1 to 7 are electric wires (ultrathin low-voltage electric wires) that satisfy abrasion resistance, thermal stability, low-temperature resistance, heat resistance, and processability at a high level.

In contrast, it has been found that the electric wires of Comparative Examples 1 to 7 are electric wires (ultrathin low-voltage electric wires) having at least one insufficient property out of abrasion resistance, thermal stability, low-temperature resistance, heat resistance, electric wire surface roughness, and eccentricity amount. Therefore, it has been found that the electric wires of Comparative Examples 1 to 7 are electric wires (ultrathin low-voltage electric wires) having at least one insufficient property out of abrasion resistance, thermal stability, low-temperature resistance, heat resistance, and processability.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An ultrathin low-voltage electric wire for an automobile, the wire comprising:
    a conductor part; and
    an insulating layer covering an outer periphery of the conductor part; wherein
    the insulating layer includes a resin composition containing 100 parts by mass of a vinyl chloride resin, 29 to 31 parts by mass of a trimellitic acid-based ester plasticizer, 0.3 to 1.0 parts by mass of a processing aid, 7 to 11 parts by mass of a thermal stabilizer, and
    1 to 5 parts by mass of a modifier includes a methyl methacrylate-butadiene-styrene copolymer, an acrylonitrile-butadiene-styrene copolymer, a chlorinated polyethylene, or an ethylene-vinyl acetate copolymer, the conductor part has a cross-sectional area of $0.13 \pm 0.02$ mm$^2$, and the insulating layer has a thickness of 0.16 to 0.25 mm.

2. A wire harness, comprising:
    the ultrathin low-voltage electric wire for an automobile according to claim 1.

* * * * *